United States Patent
Swegle et al.

(10) Patent No.: US 9,808,024 B1
(45) Date of Patent: *Nov. 7, 2017

(54) QUICK RELEASE HEAD ASSEMBLY ON COTTON CANDY MACHINE

(71) Applicants: David Swegle, Nevada, IA (US); Liansuo Xie, Ankeny, IA (US)

(72) Inventors: David Swegle, Nevada, IA (US); Liansuo Xie, Ankeny, IA (US)

( * ) Notice: Subject to any disclaimer, the term of this patent is extended or adjusted under 35 U.S.C. 154(b) by 630 days.

This patent is subject to a terminal disclaimer.

(21) Appl. No.: 13/625,983

(22) Filed: Sep. 25, 2012

Related U.S. Application Data

(63) Continuation of application No. 12/691,577, filed on Jan. 21, 2010, now Pat. No. 8,376,064.

(60) Provisional application No. 61/205,530, filed on Jan. 21, 2009, provisional application No. 61/212,174, filed on Apr. 8, 2009.

(51) Int. Cl.
- *A23G 3/10* (2006.01)
- *A23G 3/34* (2006.01)
- *D01D 5/18* (2006.01)

(52) U.S. Cl.
CPC .............. *A23G 3/10* (2013.01); *A23G 3/0051* (2013.01); *D01D 5/18* (2013.01); *Y10T 29/53143* (2015.01); *Y10T 279/3412* (2015.01); *Y10T 279/3418* (2015.01)

(58) Field of Classification Search
CPC .......... A23G 3/10; A23G 3/0051; D01D 5/18; B23B 31/10; B23B 345/003; Y10T 29/5313; Y10T 29/53143; Y10T 279/34; Y10T 279/3406; Y10T 279/3412; Y10T 279/3418
USPC .................. 425/9; 173/164; 29/729, 732
See application file for complete search history.

(56) References Cited

U.S. PATENT DOCUMENTS

| | | | | |
|---|---|---|---|---|
| 792,710 A | * | 6/1905 | Kochs | A23G 3/10 425/9 |
| 816,114 A | * | 3/1906 | Morrison | A23G 3/10 425/9 |
| 847,366 A | | 3/1907 | Pollock | |

(Continued)

FOREIGN PATENT DOCUMENTS

| | | | | |
|---|---|---|---|---|
| FR | 2672470 A1 | * | 8/1992 | A23G 3/10 |
| JP | 2-86733 A | | 3/1990 | |

OTHER PUBLICATIONS

English translation for J. P. Lepeuple, FR 2 672 470, published on Aug. 14, 1992.*

*Primary Examiner* — Seyed Masoud Malekzadeh
(74) *Attorney, Agent, or Firm* — McKee, Voorhees & Sease, PLC

(57) ABSTRACT

An apparatus and method for quick release of a spinner head assembly of a cotton candy machine. The spinner head is snap-fit to the rotational output shaft of the motor of the cotton candy machine to prevent longitudinal separation between the two during operation. Intermeshing portions between the spinner head and the output shaft are configured to translate rotational torque between the two and thus translate rotational torque of the output shaft of the motor to the spinner head. Quick release of the head is possible by pulling on the head along the rotational axis of the output shaft to overcome the snap-fit. This allows longitudinal separation of the spinner head and disengages the intermeshing portions for complete removal of the head. Reattachment is possible by snap-fitting connection between head and output shaft.

8 Claims, 17 Drawing Sheets

(56) References Cited

U.S. PATENT DOCUMENTS

| | | | | |
|---|---|---|---|---|
| 1,489,342 A | * | 4/1924 | Brent | A23G 3/10 425/162 |
| 1,541,378 A | * | 6/1925 | Parcell | A23G 3/10 307/155 |
| 2,760,258 A | * | 8/1956 | Rieger | F16B 3/04 285/321 |
| 2,844,471 A | * | 7/1958 | Boardway | 426/124 |
| 3,036,532 A | * | 5/1962 | Bowe | A23G 3/10 425/130 |
| 3,232,244 A | * | 2/1966 | Wallace et al. | 425/9 |
| 3,759,336 A | | 9/1973 | Marcovitz | |
| 4,288,397 A | | 9/1981 | Snowden et al. | |
| 4,731,001 A | * | 3/1988 | Yamamoto et al. | 425/7 |
| 4,793,782 A | * | 12/1988 | Sullivan | A23G 3/10 264/8 |
| 4,846,643 A | * | 7/1989 | Yamamoto et al. | 425/7 |
| 4,872,821 A | * | 10/1989 | Weiss | D01D 5/18 219/214 |
| 5,145,687 A | * | 9/1992 | Parker | A23G 3/10 425/131.5 |
| 5,427,811 A | | 6/1995 | Fuisz et al. | |
| 5,441,754 A | | 8/1995 | Evans, Sr. | |
| 5,445,769 A | | 8/1995 | Rutkowski et al. | |
| 5,447,423 A | | 9/1995 | Fuisz et al. | |
| 5,458,823 A | | 10/1995 | Perkins et al. | |
| 5,498,144 A | | 3/1996 | Francis et al. | |
| 5,683,720 A | | 11/1997 | Myers et al. | |
| 5,766,643 A | * | 6/1998 | Hammon | A23G 3/10 264/8 |
| 5,834,033 A | | 11/1998 | Abdi et al. | |
| 6,116,880 A | | 9/2000 | Bogue et al. | |
| 6,284,164 B1 | | 9/2001 | Weiss | |
| 6,286,611 B1 | | 9/2001 | Bone | |
| 6,585,504 B2 | | 7/2003 | Weiss | |
| 6,634,439 B2 | | 10/2003 | Driessen | |
| 6,971,675 B2 | | 12/2005 | Dahmer | |
| 2002/0062743 A1 | * | 5/2002 | Weiss | A23G 3/10 99/348 |
| 2002/0192319 A1 | * | 12/2002 | Todokoro | 425/9 |
| 2004/0185131 A1 | | 9/2004 | Weiss | |
| 2005/0011366 A1 | * | 1/2005 | Kowalski | A23G 3/10 99/331 |

\* cited by examiner

SECTION C-C

SECTION A-A

SECTION B-B

SECTION A-A

DETAIL B

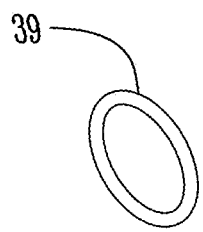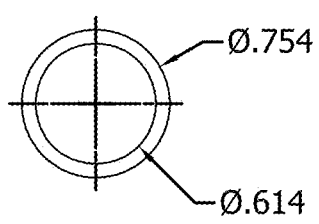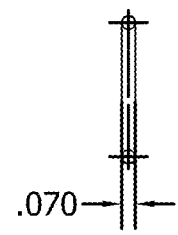
*Fig. 14A*  *Fig. 14B*  *Fig. 14C*

VIEW B-B

SECTION A-A

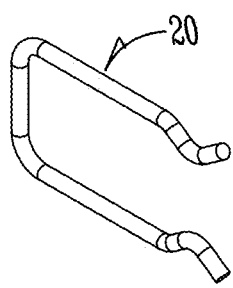
Fig.16A
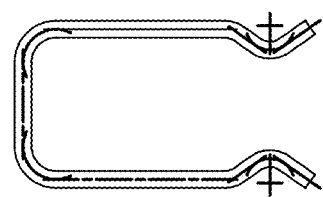 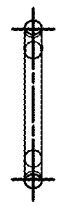
Fig.16B  Fig.16C

SECTION A-A

SECTION B-B

DETAIL C

SECTION D-D

QUICK RELEASE HEAD ASSEMBLY ON COTTON CANDY MACHINE

CROSS-REFERENCE TO RELATED APPLICATIONS

This application is a Continuation Application of U.S. Ser. No. 12/691,577 filed Jan. 21, 2010, now issued as U.S. Pat. No. 8,376,064 which claims priority under 35 U.S.C. §119 to provisional application Ser. No. 61/205,530 filed Jan. 21, 2009 and Ser. No. 61/212,174 filed Apr. 8, 2009, all of which are incorporated by reference in their entirety.

I. BACKGROUND OF THE INVENTION

A. Field of the Invention

The present invention relates to cotton candy machines, and in particular, how the rotating or spinner head assembly of a cotton candy machine is detachable and re-attachable from and to the machine.

B. Problems in the Art

Cotton candy making machines have a relatively long history. They have retained their basic form. They typically utilize a rotating spinner head assembly. That head assembly rotates at substantial speeds (e.g. several thousand RPM) by connection to an electric motor in the base of the machine. An electric heating element is in the head. Therefore, electrical power must be provided to the spinning head. This usually requires something like a slip ring assembly to transfer electrical power to a base of the machine to the spinning spinner head. A raw cotton candy, sugar-based solution is poured into the head. The rotation of the head throws the sugary solution by centrifugal force out to the walls of the head and through screens or openings to basically create the fluffy cotton candy caramelized sugarized strains. Those strains are caught in a bowl that surrounds the head.

U.S. Pat. No. 3,036,532 and published U.S. Patent Application US2002/0062743 A1 illustrate several examples of these types of cotton candy machines. Details regarding them can be seen in those patents, which are incorporated by reference in their entireties herein as background information.

There are several interesting and subtly-related factors that come into play with these types of cotton candy machines. One is the relatively extreme rotational speeds of the head. These machines are utilized in a variety of settings; sometimes using workers that are not experts with these machines. The connection of the rotating head to the motor shaft must be robust. Even though the spinner heads are relatively lightweight, spinning at such high RPM creates substantially forces. These forces not only can include centrifugal force but, because of manufacturing tolerances, substantial vibration forces in different directions.

Additionally, the electrically-energized heating element in the head must maintain electrical connection to an electrical power source while the head is rotating. Thus, a variety of ways have been developed to try to reliably do so. Several are described in detail in the incorporated by reference patent and published patent application listed earlier. For electrical connections using conducting rings and brushes, the head-to-motor-shaft connection must be not only robust but also ensure that electrical power to the head is maintained when operating.

But moreover, the general operational environment of these machines creates rather unique issues. The sugary substance involved with cotton candy is messy, coats components, and can make it important to frequently clean the machine. It is desirable to restrain the substance to the bowl around the rotating head. It is desirable to be able to clean the bowl as well as the head. To do so thoroughly generally requires the ability to remove the bowl and the head from the machine. This can be antagonistic to having a robust connection between head and rotating shaft and a good electrical connection between head and remainder of the machine.

For example, over time the screens or small openings in typical cotton candy machine spinner heads get clogged with the cotton candy solution and must be cleaned out. One conventional way to attach a head to a motor drive shaft is with an Allen screw, bolt or pin or other set screw. It can be difficult for non-mechanical persons, or persons not familiar with the machine, to find and then remove this fastening mechanism to remove the head and reattach it in the secure manner.

A further consideration is that not only is it desirable that the head be detachable, but that both detachment and reattachment be as easy and efficient as possible. It is also desirable that reattachment provide high confidence to the operator that the reattachment is secure. It is not desirable to rely on an operator's mechanical skills to ensure good reattachment. There are also issues with expired conducting surfaces and motors when the head is removed from the base.

FIGS. 1-3 illustrate a typical present way of attaching a cotton candy machine spinner head to the drive shaft of the motor. The lower end of adapter head 4 is bolted to spinner head 2 (e.g. see bolt 11 which clamps spinner head 2 to adapter head 4 by tightening it into threaded bore 12 in the upper end of adapter head 4. This allows spinner head 2/adapter head 4 to be attached and detached from motor shaft 5 by slideably fitting the bottom end of adapter head 4 over the upper or distal end of motor shaft 5.

Attachment and detachment of the head 2 is achieved by tightening or loosening a single Allen or set screw 7 with an Allen Wrench tool 9 through a small blind hole 3 in housing or base 1. The head 2 can be marked for the orientation of the setscrew 7 (see visual dot 10 placed on the outside of head 2 in FIG. 1; this dot 10 can be lined up with the blind hole 3 in base to try to line up set screw 7 with blind hole 3 so that it can be accessed by Allen Wrench tool 9 through blind hole 3). However, there are difficulties with this arrangement. Aligning dot 10 with blind hole 3 is an approximation. It may not indicate consistent exact alignment. Thus, the user may have to find set screw 7 with wrench 9 by trial and error, as it is not possible to get a good visual view of set screw 7. Also, mark 10 might no longer be there or may not be visible after the machine is used for awhile. To remove head 2 then has to be done through even more trial and error to find setscrew 7 in blind hole 3. Note also that if the Allen wrench or other tool is lost or misplaced, it may be very difficult if not impossible to detach or attach the head at least until another appropriate tool is obtained.

Note that motor shaft 5 can have a flat spot 6 to receive the setscrew 7, to help ensure torque is transferred from motor 8 to the head 2. As can be appreciated, if said screw 7 is not firmly installed, forces generated by the high RPM rotating or spinner head can create vibrations or other forces which attempt to try to separate the rotating or spinner head from its shaft or which cause the motor shaft to slip relative the head. This could cause malfunction or at least poor operation. Even relatively small separation might also affect electrical connection between electrical brushes of a slip ring assembly in base 1 (see, e.g., FIGS. 2 and 11) and conducting rings on the head. Also, over time, the setscrew can dig into the motor shaft or can strip in its threads which create risk of malfunction or poor operation.

FIG. 3 shows in section view setscrew 7 and its relationship with motor shaft 5. It also illustrates the relationship of electrical brushes with conducting rings on the head 2.

The single set screw is central to this state of the art detachable head assembly.

SUMMARY OF THE INVENTION

It can therefore be appreciated that it is a primary object, feature, aspect or advantage of the present invention to improve upon the existing state of the art.

Further objects, features, advantages, or aspects of the invention include:
  a. An apparatus and method to detach and attach a spinner head assembly of a cotton candy machine to the motor shaft easily, efficiently, and repeatedly.
  b. An apparatus and method to detach and attach a spinner head assembly without a tool.
  c. An apparatus and method to provide feedback with regard to when the spinner head is in the appropriate attached position.
  d. A method and apparatus which is not complex but is robust with respect to the competing factors involved with cotton candy machines including, but not limited to, high head rotational speeds, exposure to the sugary substances, exposure to heat, need to convey electricity from the base to the spinning head, and need for repeated attachment and disattachment over time.
  e. A method and apparatus which automatically handles exposure of conducting surfaces and moving parts when a spinner head is removed.

These and other objects, features, aspects and advantages of the invention will become more apparent with the accompanying specification.

BRIEF DESCRIPTION OF THE DRAWINGS

FIGS. 14A-C are enlarged isometric views of an O-ring which can be used with shaft adapter 14B of FIG. 13 namely, perspective, plan, and edge views respectively.

FIGS. 16A-C are enlarged isometric views of spring clip 20 namely, perspective, plan, and edge views, respectively.

DETAILED DESCRIPTION OF EXEMPLARY EMBODIMENTS

A. Overview

For a better understanding of the invention, an example of one form it can take will now be described in detail. Reference will be taken to the appended figures. Reference numbers will be used to indicate certain parts and locations in the figures. Those reference numbers will refer to the same parts and locations throughout the figures unless otherwise indicated.

This exemplary embodiment is in the context of a cotton candy machine of the type indicated in the figures. This type of machine includes a spinner head 2 attached to a rotating output shaft 5 of an electrical motor 8. Electrical energy is conveyed to the spinner head 2 through a slip ring assembly, e.g. brush and conducting ring combination, (or other configuration), such as is known in the art. The drawings are shown without the conventional bowl around the spinner head. (An example such a bowl can be seen at FIG. 1 of published application US 2002/0062743 A1).

B. Apparatus

Figure 1:
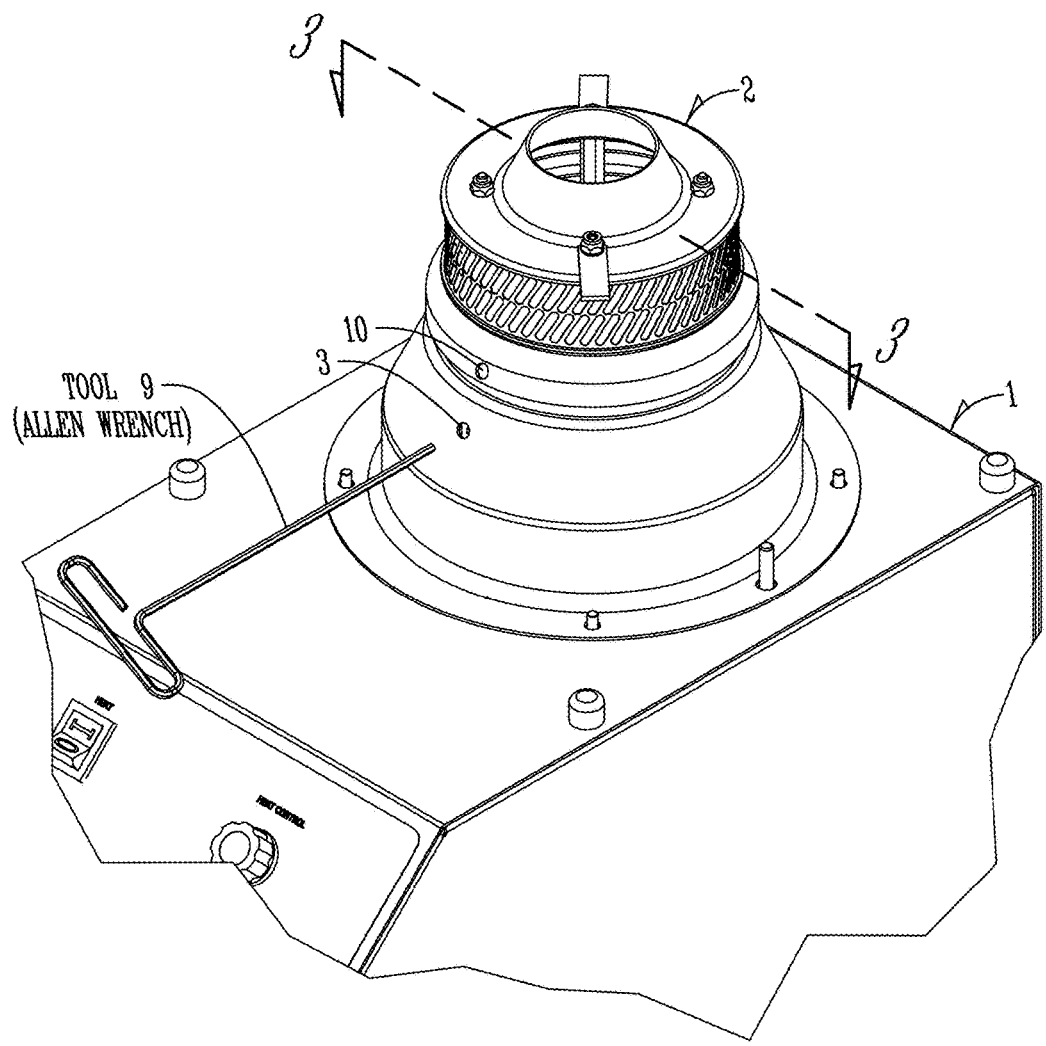
FIG. 1 is a perspective view of a typical cotton candy machine with the bowl removed, and showing the tool used to release the head from the remainder of the machine.
Figure 2:
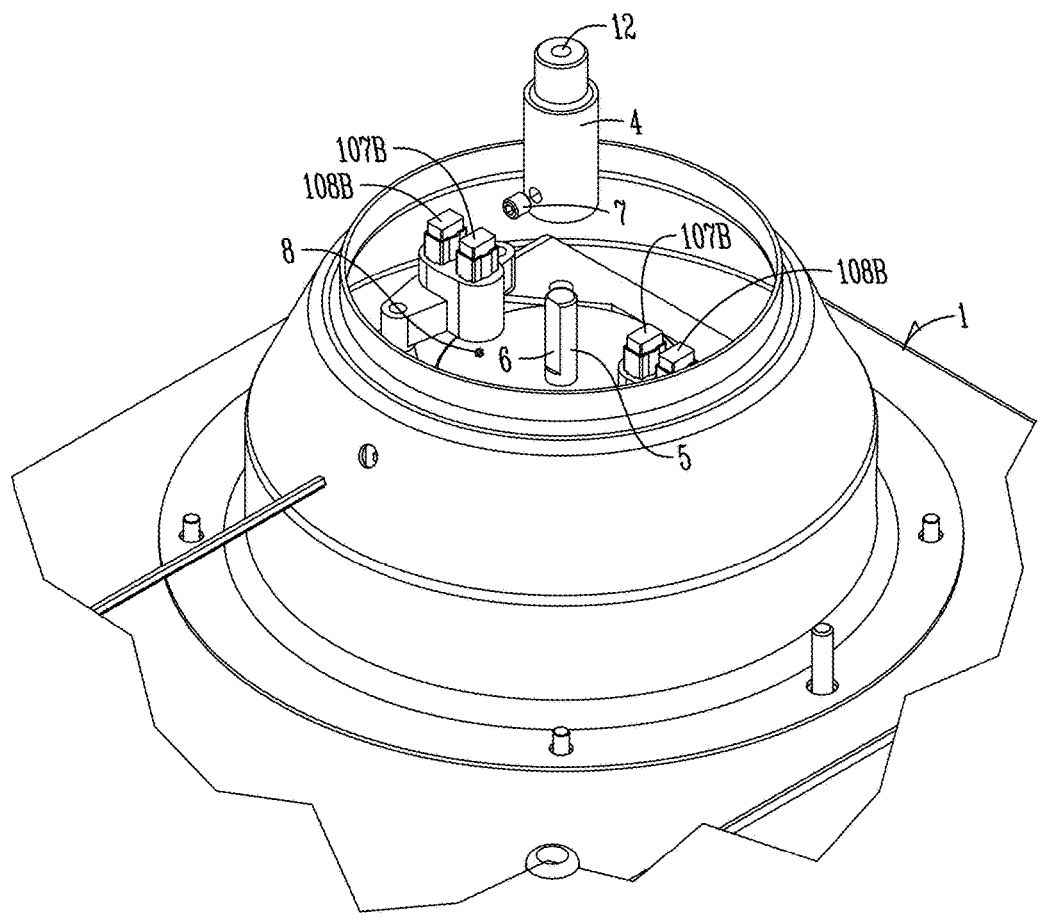
FIG. 2 is an enlarged perspective, partially exploded view of the typical connection member connecting the spinner head (not shown) to the motor shaft of the machine of FIG. 1.
Figure 3:
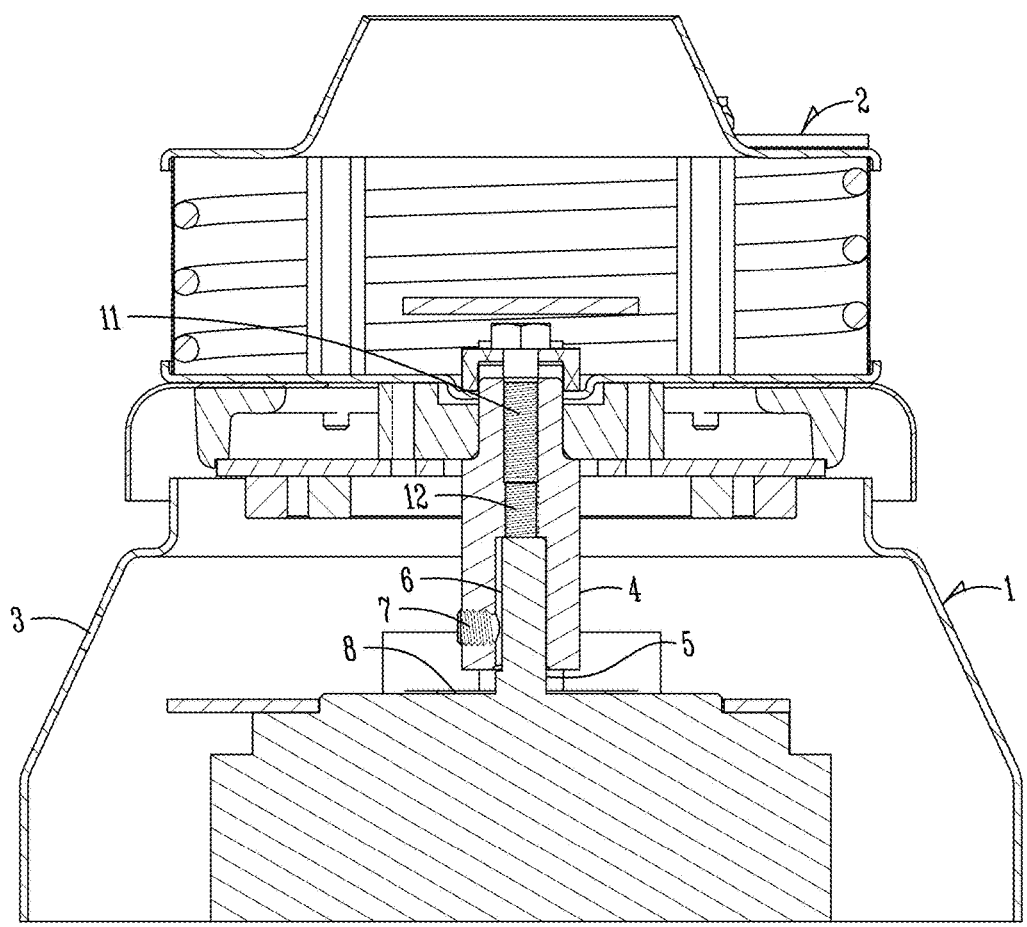
FIG. 3 is an enlarged section view taken along line 3-3 of FIG. 1 with the spinner head attached to the motor shaft with the connection member of FIG. 2 and a setscrew.

Typical basic components of a cotton candy machine have been previously described with regard to FIGS. 1-3. A base 1 would house an electrical motor 8 having an output shaft 5. At the top of base 1 would be mounted a spinner head 2 which includes an electric heating element and a screen with openings, as is typical. Reference can be taken to U.S. Pat. No. 3,036,532 and published U.S. Patent Application US2002/0062743 A1, and to other commercially available machines for examples of conventional features.

FIGS. 4 through 17A-G show the details regarding quick release components for the spinner head according to a first exemplary embodiment of the present invention.

The lower component 14B is secured to the motor shaft 5 by two setscrews 17A and 17B. Lower component 14B will also be referred to as shaft adapter 14B. It adapts motor shaft 5 to the quick release aspect of this embodiment.

The shaft extension component 14A is connected to the head assembly 2 in the same way as with the head 2 of FIGS. 1-3 (by a bolt or machine screw axially through the top into a threaded bore). Upper component 14A will also be referred to as shaft extension 14A. It is mounted to head 2 and has features with allow it (and thus head 2) to be quickly and easily attached and detached from shaft adapter 14B. Thus, when shaft adapter is mounted on motor shaft 5, head 2 is quickly and easily attached and detached from machine body 1 by the quick attach/detach features of components 14A and B, as will be further illustrated and discussed below.

Shaft extension 14A has two slots or openings 21A, 21B aligned in a plane basically transverse to the longitudinal axis of shaft extension 14A to receive opposite arms of spring clip 20.

Figure 15A:
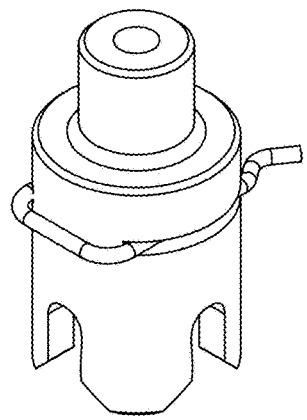
FIGS. 15A-D are isometric views of the shaft extension 14A of FIG. 12 with coordinated spring or retention clip 20 of FIG. 4 in installed position namely, perspective, top plan, side, and section A-A, respectively.
Figure 15B:
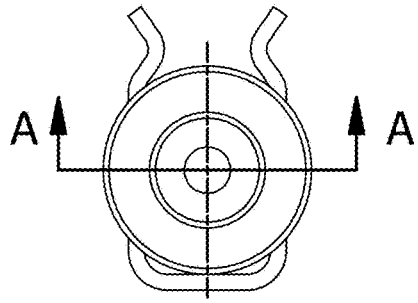
Figure 15C:
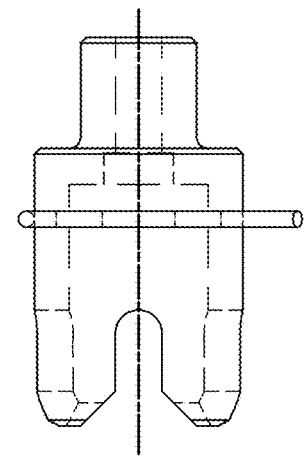
Figure 15D:
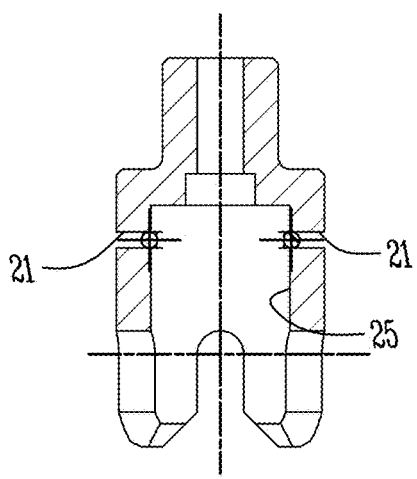
Figure 17A:
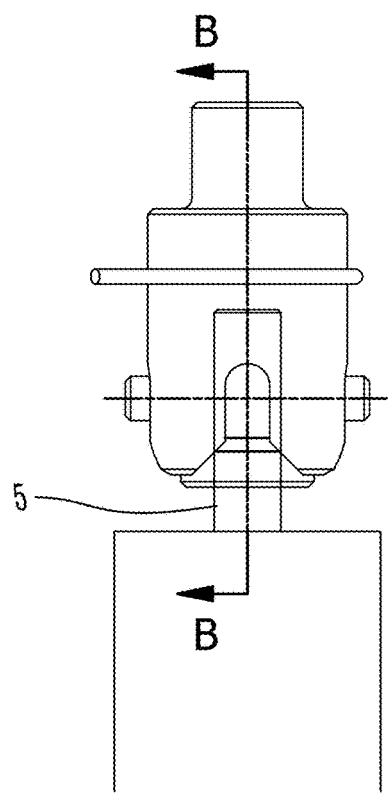
FIGS. 17A-G are isometric views of the shaft extension 14A, shaft adapter 14B, and clip 20 in installed position on shaft 5 of the electric motor of an ice making machine namely, side elevation, side elevation from different perspective, top plan, section A-A, section B-B, detail C, and section D-D, respectively.
Figure 17B:
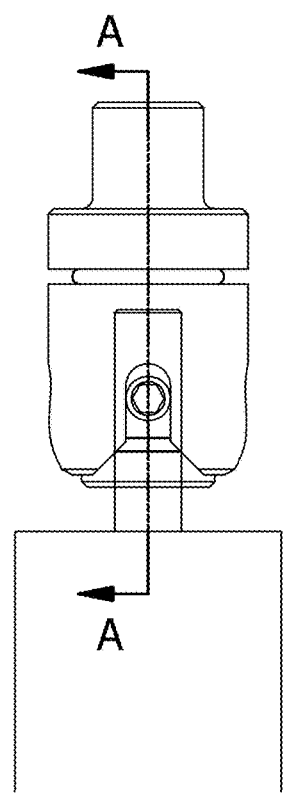
Figure 17C:
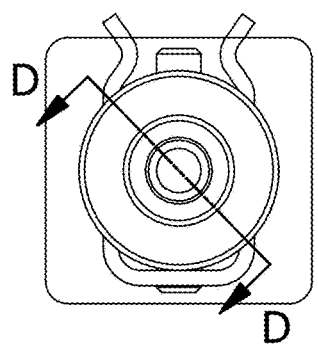
Figure 17D:
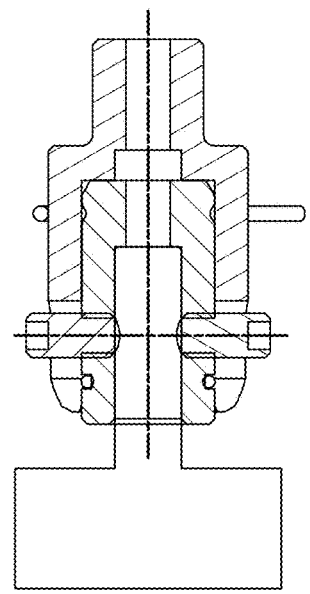
Figure 17E:
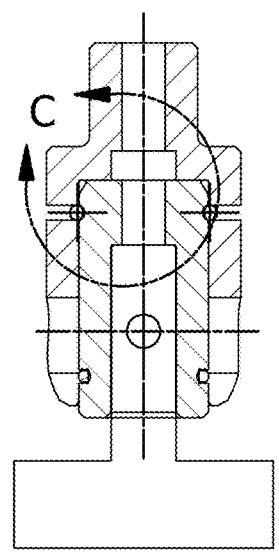
Figure 17F:
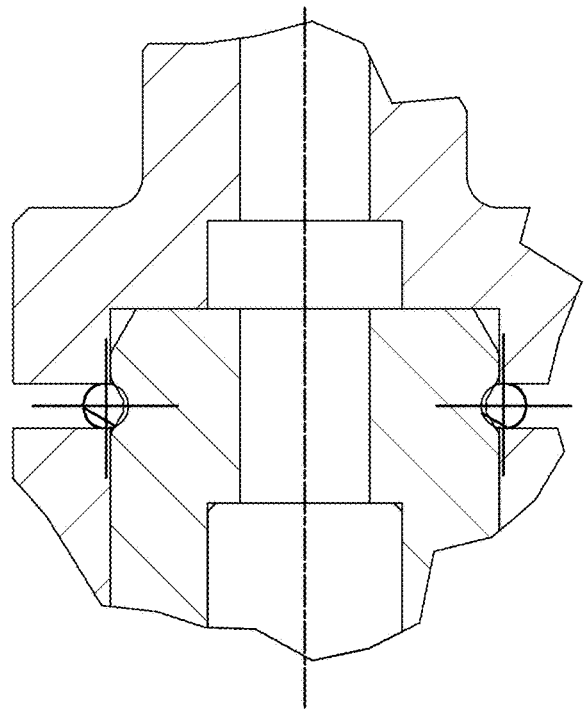
Figure 17G:
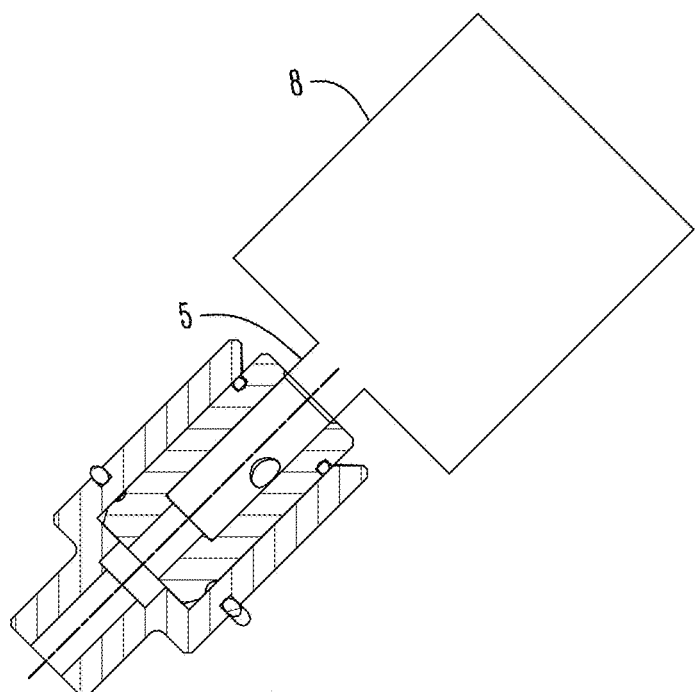

Spring clip 20 is removably attached to shaft extension 14A by spreading the arms of clip 20 and installing it into slots 21A and B (see FIGS. 15A-C). When installed, the arms of clip 20 are urged towards one another. This causes those arms to converge so that at least inner sides of the arms extend partially into interior bore 25 of shaft extension 14A (see FIG. 15D).

A chamfer 30 on the top edge of shaft adapter 14B helps spread spring clip 20 when shaft extension 14A is pushed onto shaft adapter 14B.

A groove 31 near the top of the shaft adapter 14B then receives the inner sides of the arms of spring clip 20 when the head assembly 2 is engaged to the shaft adapter 14B. The spring force of the arms of clip 20 force them into groove 31 so that (a) clip arms snap-in, so to speak, into groove 31 when they are aligned and (b) the cooperation of clip 20 and groove 31 prevent longitudinal movement of shaft extension 14A from shaft adapter 14B.

The shaft extension 14A has multiple vertical slots 22 and the bottom edges of the slots 22 have flat faces. One set of opposite slots 22 will engage the two setscrews 17A and 17B on the shaft adapter 14B to transfer rotational torque of motor shaft 5 from shaft adapter 14B to shaft extension 14A. Also, the mating of shaft extension 14A over shaft adapter 14B keeps those two parts aligned along the rotational axis of motor shaft 5.

Figure 4:
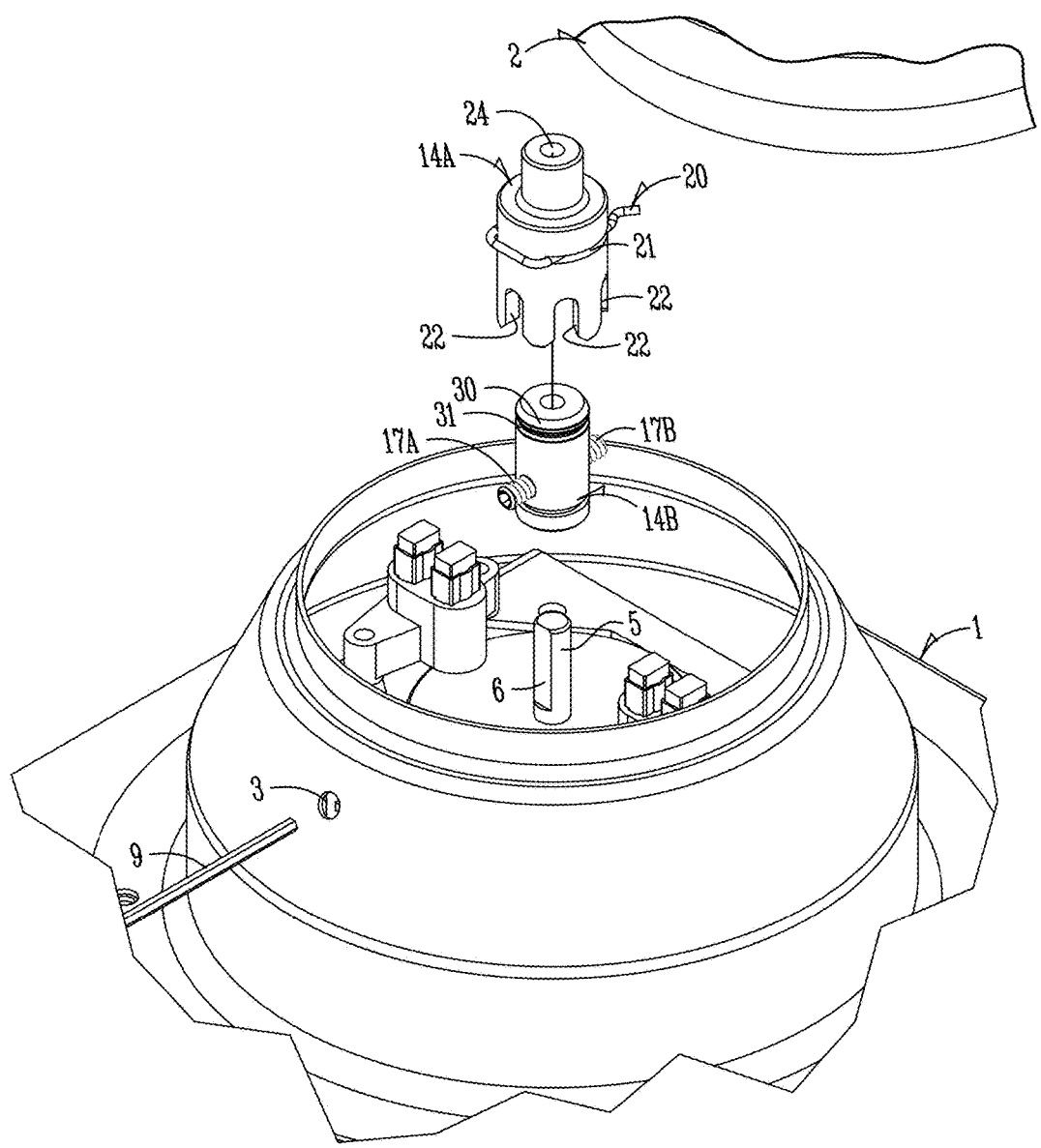
FIG. 4 is similar to FIG. 2 but illustrates an exemplary embodiment according to the present invention that would be substituted for the connection member between spinner head and motor shaft shown in FIG. 2.

Therefore, as is shown in FIG. 4, shaft extension and shaft adapter 14A and 14B provide a robust but non-complex way to connect a spinner head to a rotating motor shaft, which addresses the objects of the invention. Spring clip 20 in shaft extension 14A engages into groove 31 of shaft adapter 14B to keep the head assembly 2 in place. Uplifting force is required to detach the combination of shaft extension 14A/head assembly 2 from the shaft adapter 14B. In other words, to quickly and easily detach head 2 from base 1, without tools, the user simply has to pull upwardly on head 2 (generally along the rotational axis) with sufficient force to overcome the retaining force of clip 20 in groove 31. By selection of the characteristics of clip 20 relative to groove 31, the designer can make sure the retaining force is sufficient for normal operating conditions but easily manually overcome by most persons. As indicated, because clip 20 is basically and primarily retaining head 2 from vertical separation during operation, this retaining force does not need to be very high. Therefore, a normal person can detach head 2 by pulling up on head 2 by relatively low force. The person pulls until clip 20 spreads sufficiently to release shaft extension 14A. The person then simple continues to lift head 2 until shaft extension 14A clears shaft adapter 14B. Because electrical connections are of the slip ring nature, not other components need to be detached or disconnected to allow the user to completely remove head 2 and, for example, move it is an entirely different location such as a sink to wash it out. And then, when it is desired to re-attach head 2 to body 1, the user simply reverses the process. Head 2 is brought over base 1 so that bore 25 in shaft extension 14A is aligned with the top of shaft adapter 14B. This can be done easily and quickly by sight. Head 2 is then dropped downwardly. Note that multiple vertical slots 22 in the lower end of shaft extension 14A (as well as the widened openings into each slot 22) help a set of slots 22 "find" the set of oppositely horizontally extending set screws 17A and B on shaft adapter 14B. The user may have to rotate head 2 just slightly to seat a set of slots 22 onto setscrews 17A and B. Once a set of slots 22 finds setscrews 17A and B, shaft extension 14A is basically aligned with to the vertical rotational axis of motor shaft 5. All that is left is for the user to continue to lower head 2 downwardly until the user senses (feels, hears, etc.) clip 20 "snap into" or find groove 31 in shaft adapter 14B. A good portion of inner bore 25 of shaft extension 14A is thus mated with close tolerance over the exterior of shaft adapter 14B. Rotational movement of motor shaft 5 is imparted to head 2 by vertical slots 22 of shaft extension 14A capturing setscrews 17A and B of shaft adapter 14B. And separation along the rotational axis of head 2 from base 1 is prevented by gravity and clip 20.

Note also that the inter-cooperation of shaft adapter 14B and shaft extension 14A can be added to a conventional machine/head ½ quickly and easily as a retro-fit, or can be original equipment. Shaft adapter 14B is installed to motor shaft 5 by tightening two set screws 17A and B. Shaft extension 14A is installed to head 2 by use of a single bolt. Once components 14B and 14A are installed on motor shaft 5 and head 2, respectively, attachment and detachment of head 2 to base 1, over repeated times, is possible. But further, if head 2 must be replaced (and/or base 1), either shaft extension 14A or shaft adapter 14B can be quickly and easily uninstalled from its respective head or base and used with a new head or base.

Figure 5:
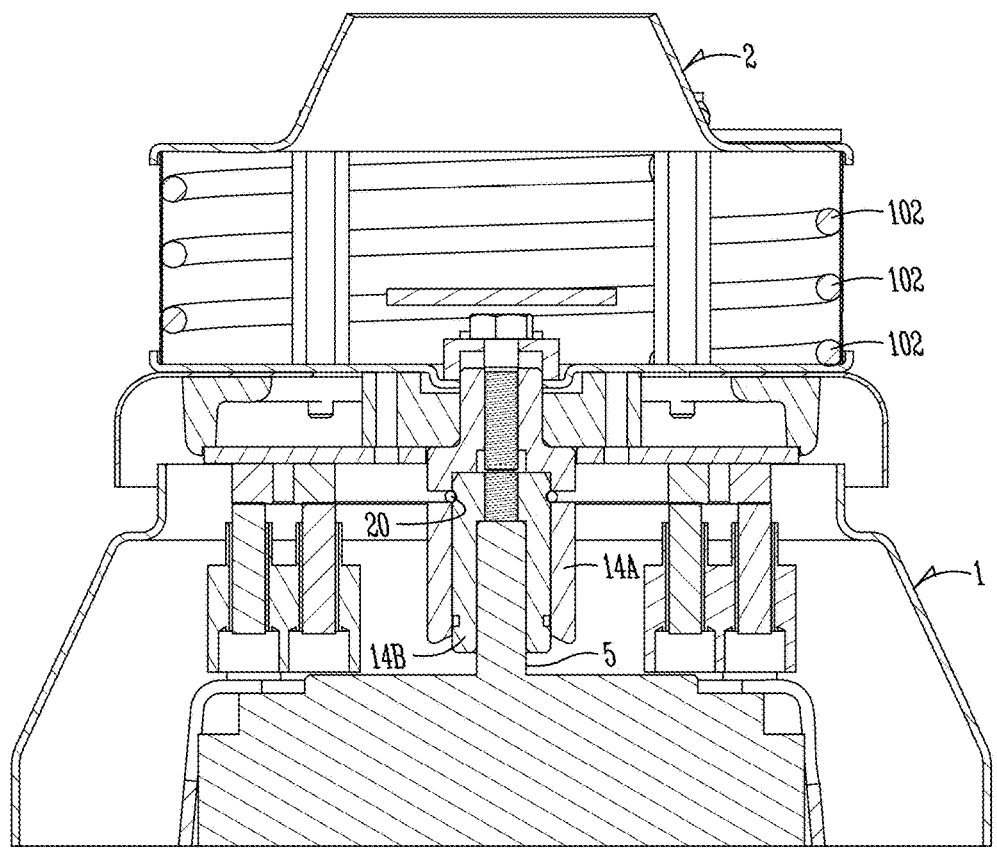
FIG. 5 is a section view similar to FIG. 3 but showing the exemplary embodiment of the present invention in operative form when the spinner head is attached to motor drive shaft.
Figure 6:
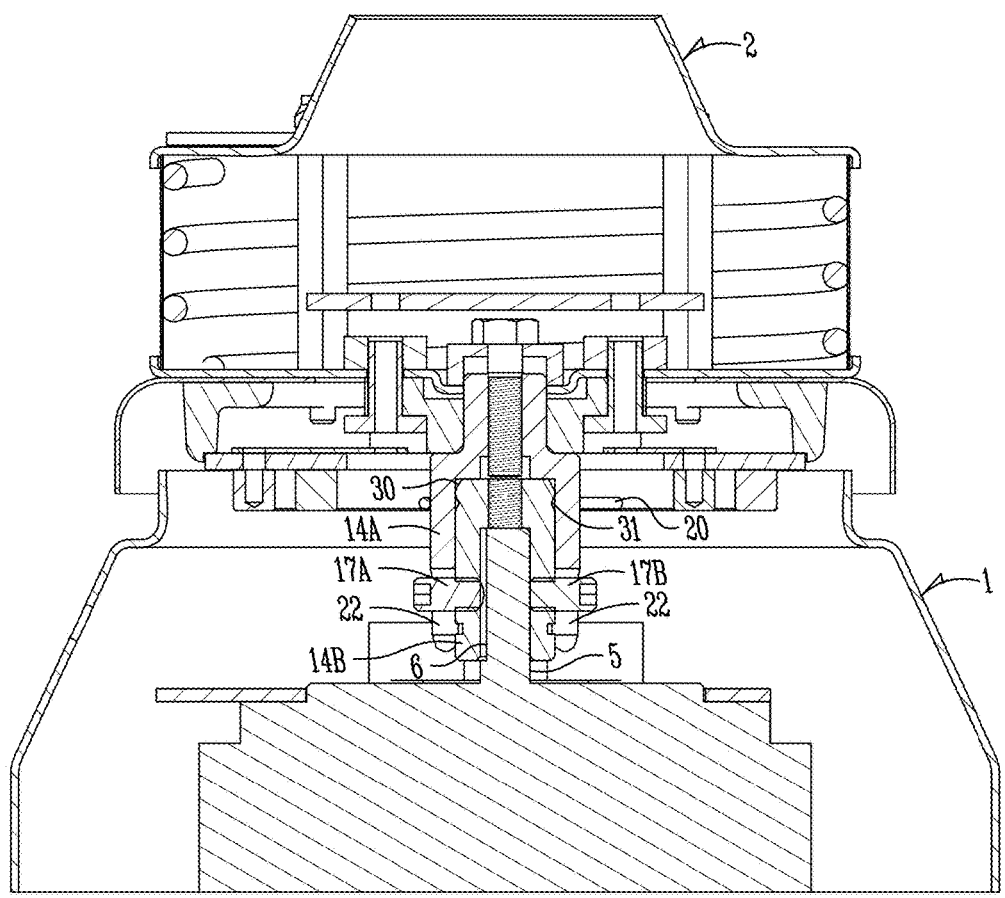
FIG. 6 is similar to FIG. 5 from a slightly different vertical section.

By also referring to FIGS. 5-8, details of how spinner head 2 is releasably assembled onto motor shaft 5 by the cooperation of shaft extension 14A and shaft adapter 14B. The sectional view of FIG. 5 shows how spring clip 20 cooperates with groove 31. FIG. 6, a different sectional view, shows how setscrews 17A and 17B cooperate with vertical slots 22 of shaft extension 14A and secure the shaft adapter 14B to the motor shaft 5. Two setscrews provide a more robust connection to the motor shaft then one (compare FIG. 3 and FIG. 6). And, with this embodiment of the invention, set screws 17A and B do not have to be frequently accessed because of shaft extension 14A and its quick release function. Two setscrews 17A and 17B on shaft adapter 14B basically lock shaft adapter 14B onto the motor shaft 5 and also drive the shaft extension 14A for rotation. Shaft adapter 14B, once installed on motor shaft 5, stays on shaft 5. Shaft extension 14A stays with spinner head 2 when head 2 is removed.

Figure 7:
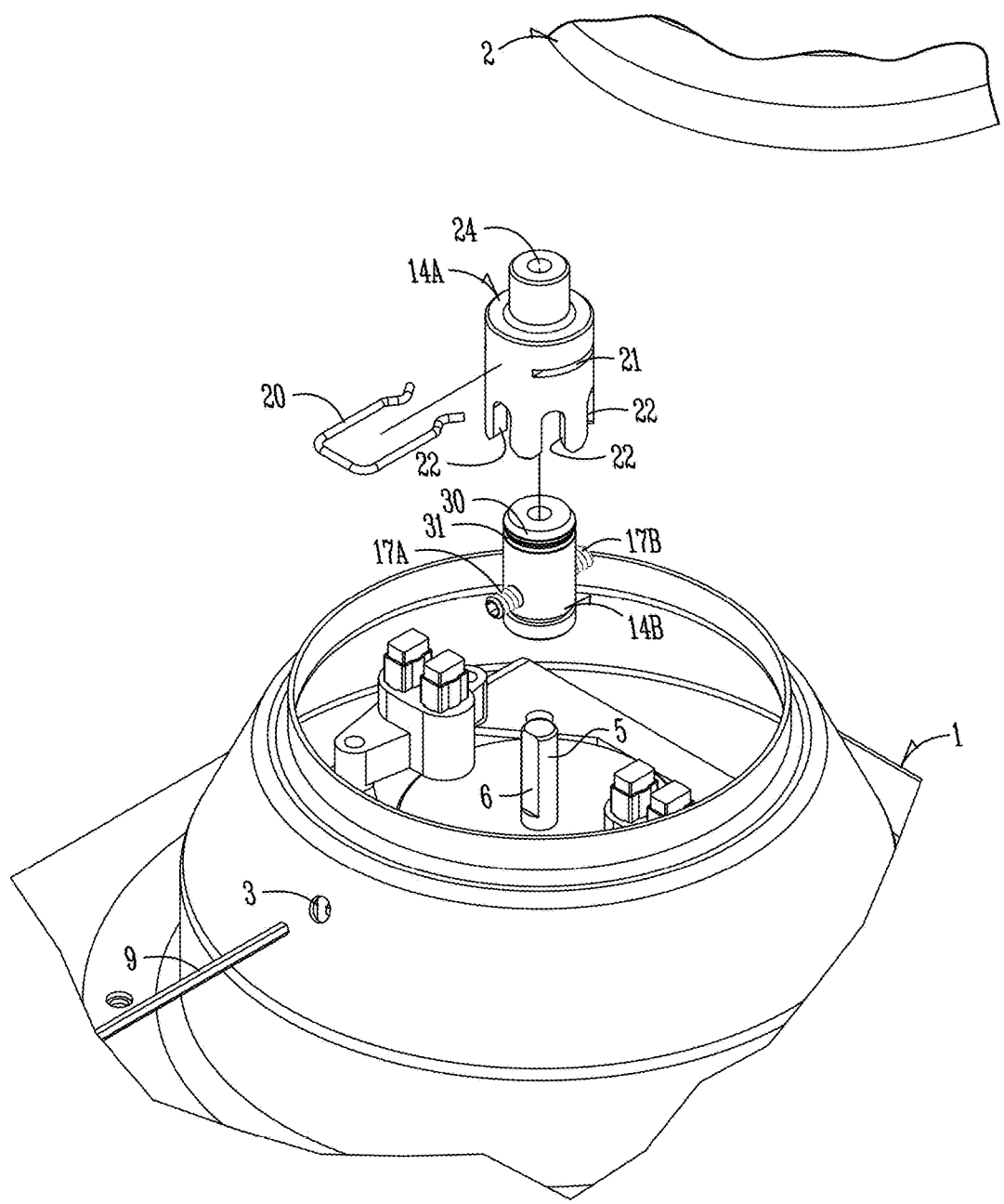
FIG. 7 is similar to FIG. 4 but shows the spring clip of FIG. 4 exploded from the shaft extension of the exemplary embodiment.
Figure 8:
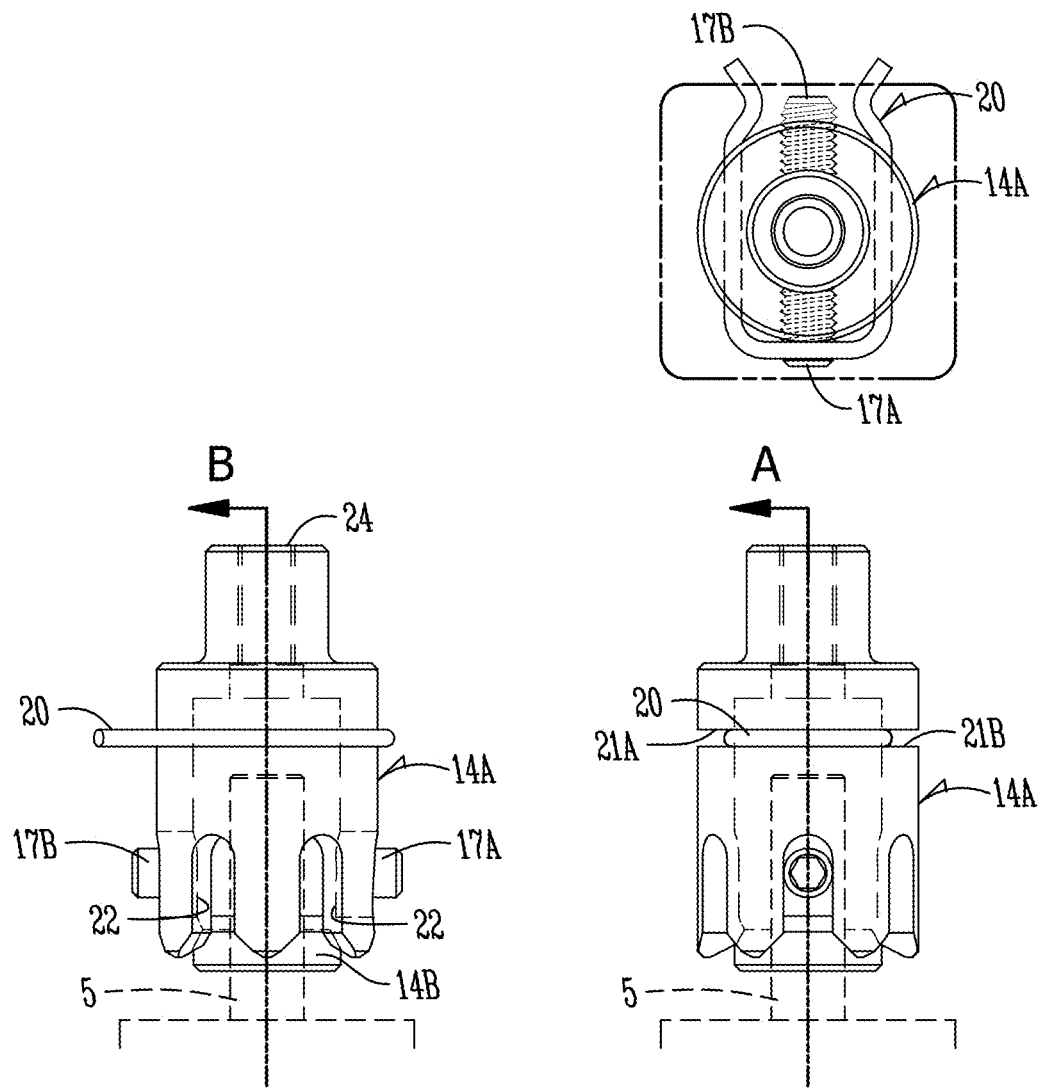
FIG. 8 is three enlarged plan views of the new connection member of the exemplary embodiment of the invention from different perspectives (top, front and one side).

FIGS. 7 and 8 provide additional detail including the specific shape of the spring clip 20 and its relationship with both shaft extension 14A and shaft adapter 14B. FIG. 7 shows shaft extension 14A and its clip 20, as well as shaft adapter 14B in exploded view relative to spinner head 2 and motor shaft 5, respectively. FIG. 8 shows multiple assembled views of the same.

Figure 11:
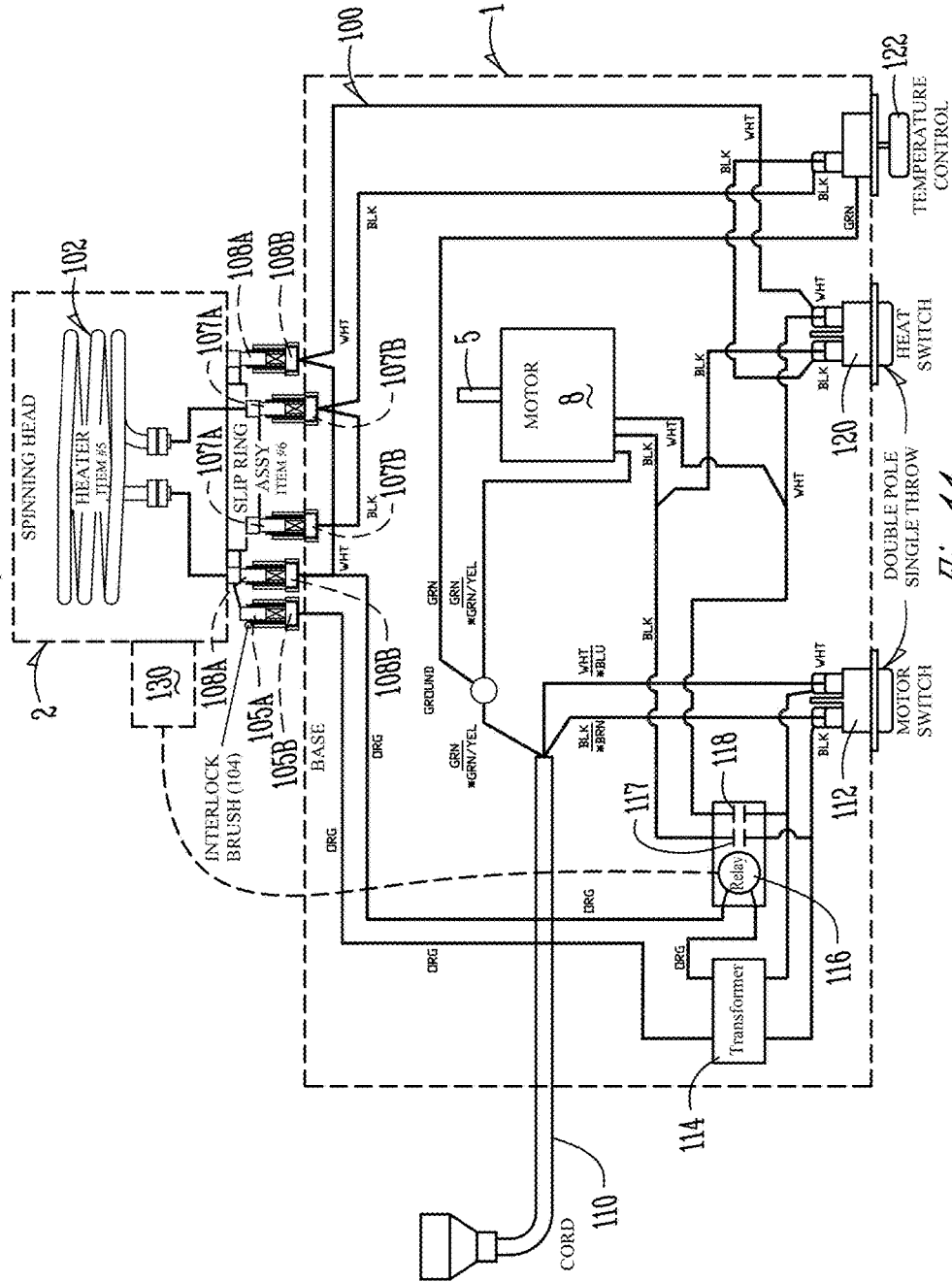
FIG. 11 is an electrical circuit diagram for the machine of FIGS. 9 and 10 also showing an embodiment of an optional automatic power disconnect sub-circuit when the head is removed.

FIG. 11 is an electrical schematic illustrating the electrical circuits and components of machine base 1 and spinner head 2. Further features, according to additional aspects of the invention, are included, and will be described later. The quick release feature works with this electric set-up.

FIGS. 12A-G through 17A-G show additional features and details.

FIGS. 12A-G shows shaft extension 17A in isolation and in various isometric views.

FIGS. 13A-E does the same for shaft adapter 17B.

FIGS. 15A-D does the same for shaft extension 14A with spring clip 20 installed thereon.

Figure 12A:
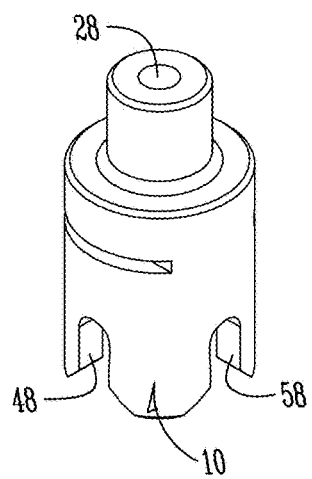
FIGS. 12A-H are isometric views of the shaft extension 14A of the embodiment of FIG. 4 namely, perspective, bottom plan, section C-C, side elevation, side elevational from different perspective, top plan, section A-A and section B-B, respectively.
Figure 12B:
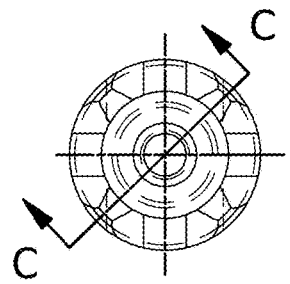
Figure 12C:
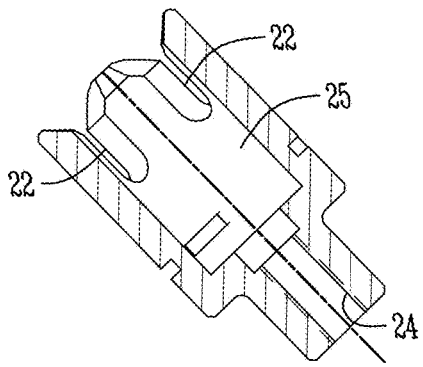
Figure 12D:
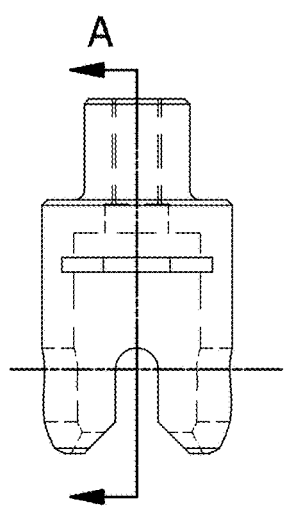
Figure 12E:
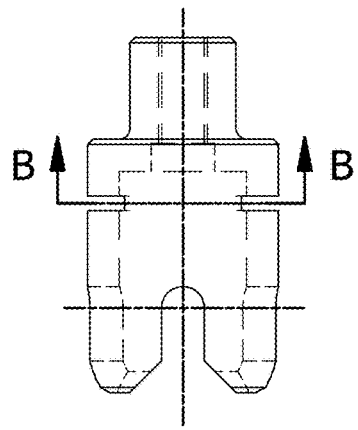
Figure 12F:
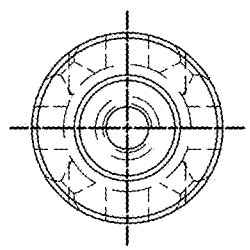
Figure 12G:
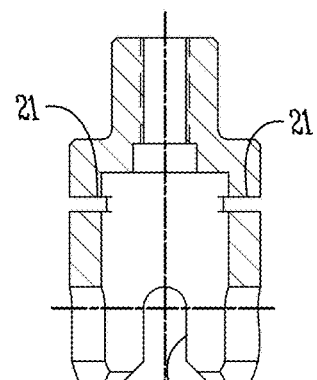
Figure 12H:
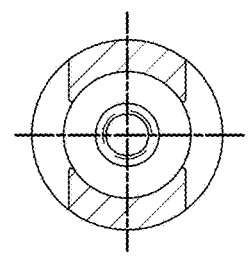
Figure 13A:
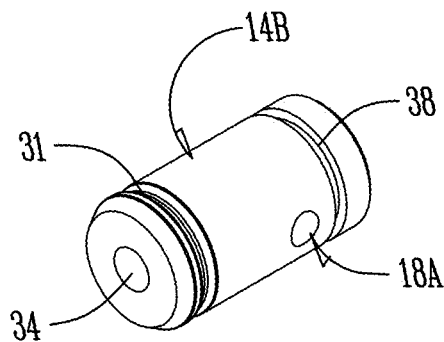
FIGS. 13A-E are isometric views of the shaft adapter 14B of the embodiment of FIG. 4 namely perspective, top plan, side, section A-A, and detail B, respectively.
Figure 13C:
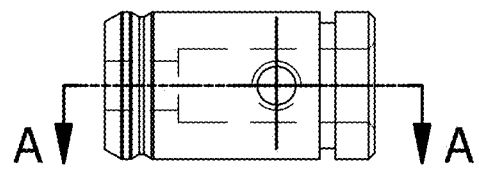
Figure 13B:
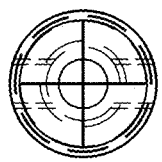
Figure 13D:
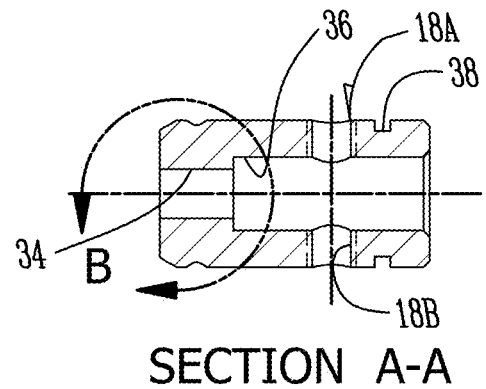
Figure 13E:
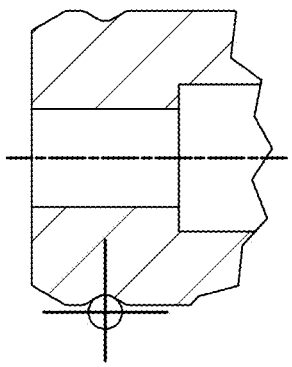

FIGS. 14A-C and 16A-C show o-ring 39 and spring clip 20 in isolation. O-ring 39 fits into complementary groove 38 nearer the bottom end of shaft adapter 14A. It can form a seal along the sidewall of shaft adapter 14A. It can also help reduce vibration and hold shaft extension 14A in longitudinal position. One example is O-ring 39 is approximately 0.62 inch ID×0.75 inch OD, 0.07 inch wide elastomer for corresponding sized components 14A and 14B. Clip 20 can be a 0.086 inch diameter stainless steel spring wire approximately 1.5 inches long. Its arms can be 0.80 inch in widest dimension and 0.68 inch between facing inner sides. Shaft extension 14A can be stainless steel have the following dimensions: Overall length of 2.1 inches. Lower part 1.125 inch (nominal) OD; 0.750/0.755 inch (nominal) ID. Upper part 0.625/0.635 inch (nominal) OD; 0.0375 inch ID and threaded for a ¼-28 UNF-28 machine screw. Each of four vertical slots 22 are spaced 90 degrees apart and 0.250/0.255 inch in width and about 0.5 inch long. Horizontal slots are 0.086/0.094 inch in height and extend a sufficient distance on opposite sides of the sidewall of the lower part of shaft extension 14A that the cross-sectional configuration of Section B-B of FIG. 12H is created. This allows opposite arms of clip 20 to extend basically parallel to one another, but with inner sides urged into bore 25 (See Section A-A of FIG. 15D). This, with the mirror-image hook shaped distal ends of the arms of clip 20, allows clip 20 to be snapped onto and retained on shaft extension 14A in slots 21, and also resiliently snap-fit into groove 31 of shaft extension 14A. Shaft adapter 14B can be stainless steel and have the following dimensions: overall length of 1.375 inches; 0.750/0.748 inch OD (nominal); large inner bore 0.370/0.375 diameter (nominal) and length of 0.995/1.000; smaller inner bore of 0.250 diameter (nominal); threaded bores 18A and B adapted for ¼-20 UNC-2A set screws (0.500 inch long, stainless steel, hex or Allen head); groove 31 basically 0.025 deep, 120 degrees angle v-cut with flat 0.023 inch bottom; groove 38 basically 0.280 wide by 0.1 deep square cut. Shaft adapter 14B is adapted to slide over an approximately 0.75 diameter motor shaft 5.

FIGS. 17A-G then show various views of shaft adapter 14B with installed o-ring 39 mounted on motor shaft 5 with set screws 17A and B; and shaft extension 14A with installed clip 20 snapped onto shaft adapter 14B.

C. Operation

Shaft adapter 14B can be initially installed to output shaft 5 of motor 8 by two setscrews 17A and 17B which are accessible through opening 3 in the machine housing by a tool such as shown in FIG. 1. This can be easily done because shaft extension 14A and spinner head 2, as well as the bowl, can be removed when first attaching shaft adapter 14B to shaft 5. Shaft 5 merely needs to be rotated between the two relevant opposite positions to allow tool alignment through, for example, blind bore 3 of housing 1 (see FIGS. 1 and 6). After initial installation, the quick release function does not depend on access to said setscrews 17A and 17B or shaft adapter 14B. Therefore, the previously mentioned problems with locating a setscrew or needing a tool after first assembly are eliminated (except if needed, such as replacement of shaft adapter 14B).

Furthermore, the ability to attach spinner head 2 to shaft adapter 14B depends primarily on just the ability to match up shaft extension 14A with shaft adapter 14B. Shaft extension 14A is previously attached to head 2 (see bolt or machine screw 11 threaded into threaded bore 24 in the top of shaft extension 14A. Even a novice operator can easily align those components (head 2 with shaft extension 14A bolted to it) and lower the head downward until there is positive tactile feedback that spring clip 20 has snapped into groove 31. Even the novice operator can feel that "snap" or "click". This provides high assurance that head 2 is in correct place and attached. As noted, the geometry of the parts cooperate to automatically initially guide the open bottom end of shaft extension 14A onto the top end of shaft adapter 14B, guide a pair of vertical slots 22 of shaft extension 14A over set screws 17A and B of shaft adapter 14B, and spread spring clip 20 sufficiently until it is lowered to where it is aligned with groove 31. The inherent pre-stressed resilient forces of spring clip 20 then cause its legs to converge and snap into groove 31. The components and their characteristics (e.g., types and characteristics of the materials) are selected according to need. For example, spring clip 20 is a size, material, and spring constant and force to hold shaft extension 14A/head 2 to shaft adapter 14B at its normal rotational speeds, but allow separation along the rotational axis with relatively small manual force (and to do so over many attachments and detachments).

As previously noted, other subtle aspects of the combination of shaft extension and shaft adapter 14A and 14B result. For example, part 14B transfers rotational torque between the shaft of the motor and the head through part 14A. Slots 22 in shaft extension 14A provide built-in torque transfer surfaces. This is in distinction to just the single setscrew of FIGS. 1-3 and sometimes one flattened side 6 of motor shaft 5.

Detachment of head 2 simply requires the user to lift upwardly with sufficient force to overcome the holding force of spring clip 20 in groove 31. This is a quick and relatively easy release without tools. As illustrated in FIGS. 5, 8, and 17A-G, spring clip 20 fits partially in groove 31 when shaft extension 14A is attached to shaft adapter 14B. The resiliency of spring clip 20 is selected to give a robust connection between 14A and 14B relative to the rotation of the head around its rotational axis but also allow detachment of the head by overcoming that clamping/retaining action of spring clip 30 relative to groove 31. Again, this does not require any tool or any mechanical proficiency.

Attachment and detachment can be repeated per the above described steps multiple times over the life of the machine. If spring clip 20 loses its effectiveness, it can simply be replaced.

It is therefore respectfully submitted that the exemplary embodiment meets at least all of the stated objectives of the invention.

D. Alternatives and Options

The above-described embodiment is but one form the invention can take and is neither inclusive or exclusive. Variations obvious to those skilled in the art would be included within the invention.

1. Miscellaneous Examples of Alternatives and Options

For example, the materials with which the components of the invention can be made can vary according to need or desire. One example would be metal of sufficient strength for these purposes. The metal for parts 14A and 14B can be, for example, the same type of metal as connection 4 of FIG. 2. This does not preclude other materials from being used if they meet operational requirements.

Likewise, the specific type of quick release connection between the upper and shaft adapters can vary. So can the attachment of the shaft adapter to the motor output shaft.

It is possible that shaft extension 14A might be built-in or made integral to head 2. It is also possible that shaft adapter 14B could be built-in or made integral with motor shaft 5.

2. Specific Example of Automatic Power Disconnect on Spinner Head Detachment An optional additional feature can be as follows with reference to the Figures.

A power supply cut off feature can be added to the machine. It works as a safety switch when the head is detached and works as a guard against electrical shock and exposed wires or conducting surfaces from coming in contact from the operator of the machine (or any person) via a proximity switch or power coupling that turns power off from the head base when the head is detached.

This can be operatively installed on a cotton candy machine in a variety of ways with a variety of components. One way, as noted above, is simply a circuit that allows electrical power to the spinner head of the machine so long as the circuit senses the removable spinner head is within a certain proximity to the base of the machine (e.g., is attached to the base), but disallows electrical power to the spinner head (or to the electrical conductors adapted to supply electricity to the head) if it sensed the head is outside acceptable proximity (e.g., removed).

Proximity sensors/switches are commercial available and well known. This option is diagrammatically indicated at FIG. 11. Proximity sensor 130 could be attached to head 2 (or base 1) in a position that it would produce a signal indicative that head 2 is within a distance from base 1 that is indicative head 2 is installed in operative position on base 1. The signal from sensor 130 could be communicated to a component which could automatically disable electrical power to the slip ring assembly 106 so that exposed conducting surfaces would automatically be prevented from being connected to an electrical power source (even if the main power switch of the machine were on). Essentially it would automatically override that main switch. As indicated in FIG. 11, one component to disable power would be a relay 116 with associated contacts 117 and 118. Contacts 117 and 118 would be normally open (non-conducting). However, if the signal from the proximity sensor indicating head 2 is attached to base 1 is received by relay 116, it would energize and close (make conducting) the contacts 117 and 118. Thus, when motor switch 112 and/or heater switch 120 is/are turned on (conducting), contacts 117 and 118 would be closed and would allow motor 8 and/or heater 102 to receive electrical power. Since head 2 is installed on base 1, the slip ring assembly 106 is not exposed to the operator. The operator runs the machine by manual selection of main motor switch 112 for rotation of head 2, heater switch 120 for creating heat in head 2, and temperature control 122 (e.g. a rheostat) for setting temperature of heater 102 in head 2. So long as the proximity sensor senses head 2 is attached to base 1, this operational mode stays in place. However, if the proximity sensor senses head 2 is moved a certain distance away from its normal installed position (by calibration of the proximity sensor to a certain separation distance), it will discontinue sending its signal to the relay. This would then de-energize relay 116, which would cause contacts 117 and 118 to return to normal open (non-conducting) state. Thus, electrical power to (a) the motor and (b) the slip ring assembly would be automatically disabled. The motor could not run and even though there would not be a complete electrical path through the slip ring assembly, even if someone would complete or short that circuit at the slip ring assembly, there would be no electrical power available to it.

Figure 10:
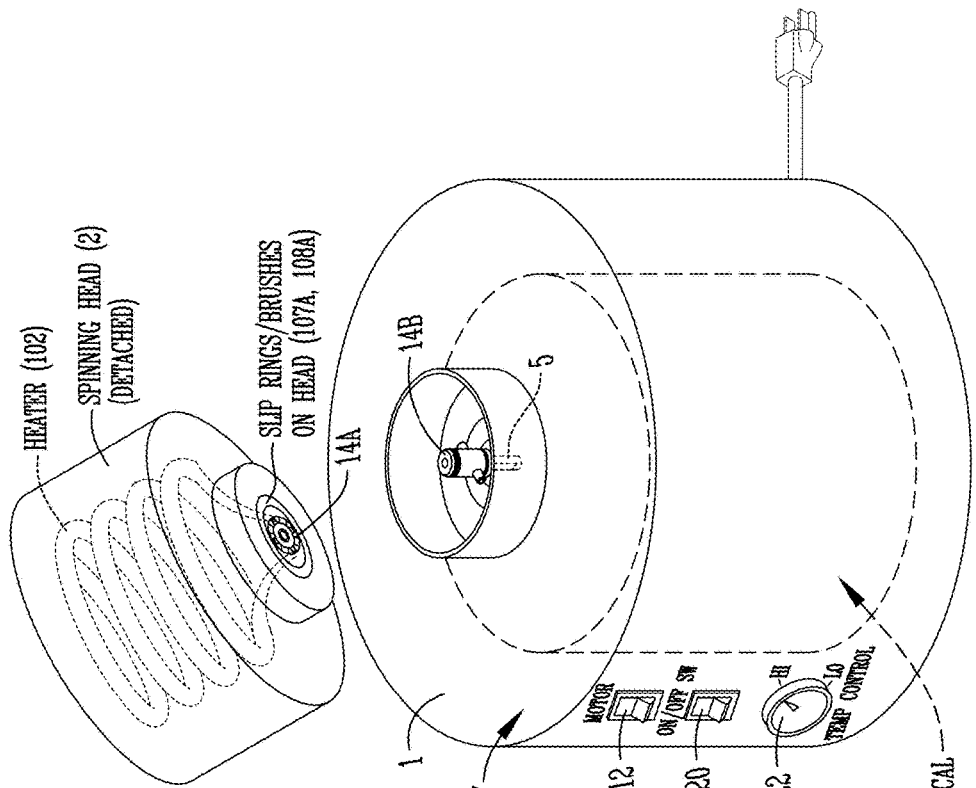
FIG. 10 is similar to FIG. 9 but showing the head removed.
Figure 9:
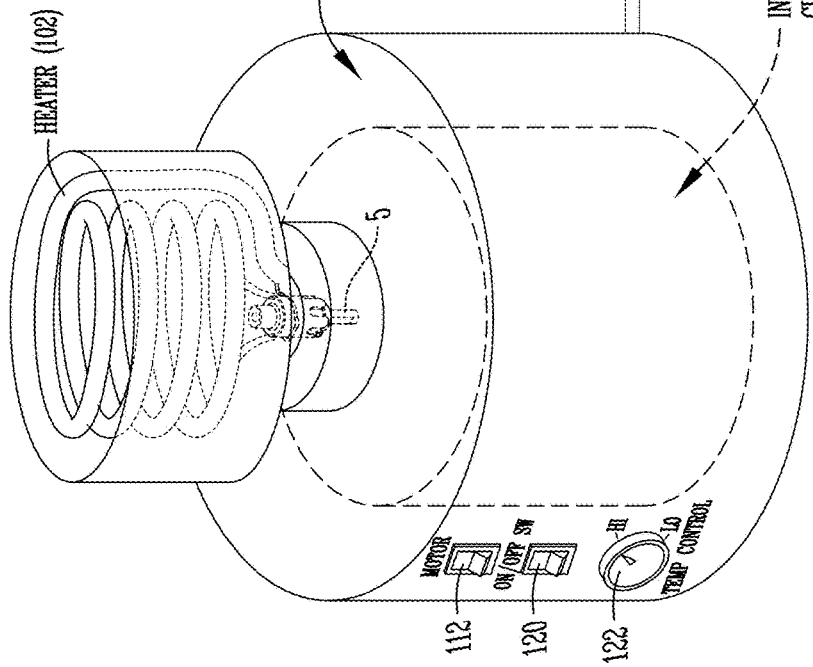
FIG. 9 is a simplified perspective view of a cotton candy machine with head attached according to another exemplary embodiment of the present invention, namely a circuit that automatically disables electrical power to the slip ring assembly when the head is removed from the body of the machine.

An alternative automatic disconnect of electrical power upon spinner head detachment is shown with particular reference to FIGS. 9-11. It is to be understood this is but a second way to effectuate automatic power disconnect upon spinning head detachment. It is given by way of example only and is neither inclusive nor exclusive of the ways.

FIGS. 9 and 10 disclose diagrammatically a cotton candy machine, including a base with a detachable spinner head. These diagrams show that spinning head detachment allows the head to be completely removed from the base for cleaning, maintenance, or the like. In this example, the method of detachment is that which is shown in the other figures and described previously.

As mentioned, electrical power is needed to the spinner head heater 102, when the cotton candy machine is operated to produce cotton candy. A typical way of providing such power with a slip ring assembly 106, such as are well known, that uses conductive slip rings and brushes to conduct electricity to the spinning head during operation. Such slip rings and brushes have electrically conductive surfaces. When the spinner head is removed, they can be exposed. This is an issue because if the heat switch 120 is on, even though the circuit is open, if someone bridges or shorts certain brushes together, there is a risk of electrical shock or damage to components. Also, removal of head 2 can expose motor shaft 5. If motor switch 112 is on, a user or other person in the vicinity may be exposed to a fast rotating motor shaft 5.

Automatic disconnect of electrical power to any exposed parts in the slip ring assembly and/or motor shaft can be effectuated as shown in the wiring diagram of FIG. 11. This electric circuit operates as follows.

Changing the double pole, single throw motor switch 112 state from open to closed enables power to the transformer 114 primary side and the relay 116 normally opened contacts 117, 118. The transformer secondary is a series circuit which flows through the relay coil 116 and slip ring interlock brushes 104.

The slip ring interlock brushes 104 associated with the transformer secondary, when not properly engaged (e.g. when spinning head 2 is lifted from base 1) prevent current flow through the relay 116 coil. The slip ring interlock brushes 104 associated with the transformer secondary, when properly engaged (e.g. when head 2 is in operative installed position on base 1) allow current to flow through the relay 116 coil. The current flow through relay coil 116 causes its normally open contacts to close; allowing power to motor switch 112 and heater switch 120. With the relay coil energized, motor 8 operates immediately. Changing the double pole, single throw heater switch 120 state from open to closed enables the power supply hot side to the temperature control 122 and the common side to the heater 102. The power hot side is switched on and off according to the temperature setting of the temperature control 122.

Therefore, when spinning head 2 is fully attached to base 1 as in FIG. 9, relay 116 allows both motor and heat switches 112 and 120 and temperature control switch 122 to be active and allows them to control power to motor 8, heat to the heater 102 in the spinning head 2, and temperature control of the heater 102 in the spinning head 2. In other words, electrical power is available to be switched on and off to the motor 8 and controlled in magnitude to the heater 102 according to operation of motor switch 112, heat switch 120, and temperature control 122. This means that the electrical conducting circuit path to the motor 8 and to the heater 102 in the spinner head 2 through the slip ring assembly 106 (with brushes 105 and conducting rings 107) is available if switched on.

But on the other hand, if spinning head 2 is removed, relay 116 does not open relay contacts 117 and 118 associated with it, and in fact, prevents that from happening. Therefore, regardless of whether motor switch 112 or heat switch 120 is turned on, electrical power cannot reach motor 8 or the slip ring assembly 106. It is only when spinner head 2 is reattached in operating condition that this can occur.

As can be seen from FIG. 11, disconnection of interlock brushes 105A and B (one in base 1, one in head 2) automatically disconnects any possibility of electrical power through the primary side of transformer 114. Therefore, this automatically prevents energization of its secondary side and energization of relay 116. This causes relay contacts 117 and 118 to return to their normally open (non-conducting) state. And, therefore, this prevents electrical power from reaching motor 8 or slip ring assembly 106. Importantly, this is regardless of whether motor switch 112, heat switch 120, or temperature control 122 are on (conducting). Thus, the user or others are not exposed to the possibility of motor shaft 5 turning (or being inadvertently turned on) with head 2 removed. The user or others are not exposed to the possibility that a set of brushes in base 1 could be shorted and electrical current flowing through conducting surfaces exposed to the user or others in the vicinity.

Transformer 114, relay 116 (and contacts 117,118), and interlock brush assembly 104 are commercially available and can be selected according to need or desire by those skilled in the art. It is to be understood that this feature can be used in combination with the quick release head 2 of FIG. 4, but either can be implemented independently.

What is claimed is:

1. A quick release apparatus for attachment of a spinner head assembly having a motor shaft receiver to a cotton candy machine electric motor having an output shaft along a motor shaft rotational axis comprising:
   a. a quick release between the spinner head assembly and the electric motor along the output shaft comprising:
      i. a two piece releasable mating connection between first and second portions allowing the second portion to slide over the first portion along the motor shaft rotational axis;
      ii. a spring clip radial receiving slot through the second portion;
      iii. a radial groove in the first portion;
      iv. a removable externally-accessible spring clip comprising resilient opposite arms that are extended substantially parallel to one another;
      v. the spring clip and the groove being related such that when the second portion slides over the first portion and the slot and groove align, the spring clip resiliently is mounted around an exterior portion of the second portion, and has a part which engages the groove in the first portion through the slot in the second portion, wherein inner sides of the arms of the spring clip install into the slot of the second portion and then are urged to snap-in to the radial groove in the first portion, to prevent separation along the rotational axis of the output shaft of the first and second portions but allows quick release detachment of the spinner head assembly from the motor by overcoming holding three of the spring clip in the groove.

2. The apparatus of claim 1 further comprising a structure on the second portion that is complimentary with structure on the first portion such that when the first and second portions are connected the complimentary structure transfers rotational torque between the two portions of the output shaft.

3. The apparatus of claim 2, wherein:
   a. the second portion comprises a motor shaft extension comprising:
      i. a longitudinal axis,
      ii. a motor shaft end with a receiver for removable connection to a motor shaft portion connected to the motor, and
      iii. an opposite end, and
      iv. wherein the structure on the second component portion comprises a radially extending member extending radially outwardly from the longitudinal axis of the motor shaft extension, and
   b. the first portion comprises a separable motor shaft adaptor, the motor shaft adaptor comprising:
      i. a longitudinal axis,
      ii. a spinner head end with a connection for the spinner head, and
      iii. an opposite end with a receiver adapted to matingly fit over the opposite end of the motor shaft extension for a distance down to and past the radially extending member,
      iv. wherein the structure on the first component comprises an elongated slot having an open end at the opposite end of the second component and running longitudinally a distance towards the spinner head end and adapted to receive the radially extending member and transfer rotational motion from the motor shaft extension to the separable motor shaft adaptor, and therefore from the motor to the spinner head.

4. The apparatus of claim 3 further comprising a second radially extending member on the motor shaft extension and a second elongated slot on the motor shaft adaptor.

5. A quick release apparatus for attachment of a spinner head assembly including an electric heating element to a cotton candy machine electric motor output shaft having a motor shaft rotational axis comprising:
   a. a motor shaft adaptor removeably mounted to the output shaft of the electric motor for the cotton candy machine along the motor shaft rotational axis;
   b. a motor shaft extension removeably mounted to a spinner head assembly of the cotton candy machine;
   c. a quick release connection between the motor shaft extension and the motor shaft adaptor comprising:
      i. a releasable mating connection allowing the motor shaft extension to slide over the motor shaft adaptor along the motor shaft rotational axis;
      ii. a spring clip radial receiving slot through of the motor shaft extension;
      iii. a radial groove in the motor shaft adaptor;

iv. a removable, externally-accessible spring clip comprising resilient opposite arms that are extended substantially parallel to one another;

v. the spring clip and the groove being related such that when the motor shaft extension is lowered to the motor shaft adaptor and the slot and groove align, the spring clip resiliently is mounted around the exterior of the motor shaft extension and has a part which engages the groove in the motor shaft adaptor through the slot in the motor shaft extension, wherein inner sides of the arms of the spring clip install into the slot of the motor shaft extension and then are urged to snap-in to the radial groove in the motor shaft adaptor, to prevent separation along the rotational axis of the output shaft of the motor shaft extension and the motor shaft adaptor but allows quick release detachment of the spinner head assembly from the motor by overcoming holding force of the spring clip in the groove.

6. The apparatus of claim 5 further comprising a switchable electrical conducting path from an electrical power source to the motor and a slip ring assembly of the cotton candy machine when the spinning head with electric heating element is operatively attached to a base of the cotton candy machine.

7. The apparatus of claim 6 wherein a relay is energized by a closed electrical path through an interlock brush assembly when the spinner head is in operative position.

8. The apparatus of claim 7 wherein the relay is energized by a transformer.

* * * * *

UNITED STATES PATENT AND TRADEMARK OFFICE
CERTIFICATE OF CORRECTION

| | |
|---|---|
| PATENT NO. | : 9,808,024 B1 |
| APPLICATION NO. | : 13/625983 |
| DATED | : November 7, 2017 |
| INVENTOR(S) | : David Swegle and Liansui Xie |

It is certified that error appears in the above-identified patent and that said Letters Patent is hereby corrected as shown below:

In Column 12, Claim 1, Line 10:
DELETE "three" after holding
INSERT --force-- after holding In Column 12, Claim 5, Line 65:
DELETE "of" after through Signed and Sealed this
Eighth Day of May, 2018

Andrei Iancu
*Director of the United States Patent and Trademark Office*